United States Patent
Henderson et al.

(10) Patent No.: US 8,949,932 B2
(45) Date of Patent: Feb. 3, 2015

(54) TECHNIQUES FOR CREDENTIAL AUDITING

(71) Applicant: Oracle International Corporation, Redwood Shores, CA (US)

(72) Inventors: Larry Hall Henderson, Orem, UT (US); Brett A. Berger, Spanish Fork, UT (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/933,754

(22) Filed: Jul. 2, 2013

(65) Prior Publication Data
US 2014/0047499 A1 Feb. 13, 2014

Related U.S. Application Data

(62) Division of application No. 12/390,713, filed on Feb. 23, 2009, now Pat. No. 8,495,715.

(51) Int. Cl.
H04L 29/06 (2006.01)
G06F 21/46 (2013.01)
G06F 21/45 (2013.01)

(52) U.S. Cl.
CPC ............... *H04L 63/20* (2013.01); *G06F 21/46* (2013.01); *G06F 21/45* (2013.01)
USPC .......................................................... 726/1

(58) Field of Classification Search
USPC ............................................................ 726/1
See application file for complete search history.

(56) References Cited

U.S. PATENT DOCUMENTS

| | | | |
|---|---|---|---|
| 5,349,355 A | 9/1994 | Longas et al. | |
| 6,516,416 B2 | 2/2003 | Gregg et al. | |
| 7,290,288 B2 | 10/2007 | Gregg et al. | |
| 8,495,715 B2 | 7/2013 | Henderson et al. | |
| 2004/0177272 A1* | 9/2004 | Walters | 713/201 |
| 2005/0027713 A1* | 2/2005 | Cameron et al. | 707/100 |
| 2005/0102534 A1 | 5/2005 | Wong | |
| 2005/0235341 A1 | 10/2005 | Stieglitz | |
| 2007/0271601 A1 | 11/2007 | Pomerantz | |
| 2008/0229384 A1 | 9/2008 | Hodgkinson et al. | |
| 2009/0019533 A1 | 1/2009 | Hazlewood et al. | |
| 2009/0132419 A1* | 5/2009 | Grammer et al. | 705/50 |
| 2010/0005107 A1* | 1/2010 | DiFalco | 707/100 |
| 2010/0218233 A1 | 8/2010 | Henderson et al. | |
| 2014/0047520 A1 | 2/2014 | Henderson et al. | |
| 2014/0047521 A1 | 2/2014 | Henderson et al. | |

OTHER PUBLICATIONS

U.S. Appl. No. 12/390,713, Final Office Action mailed on May 29, 2012, 14 pages.
U.S. Appl. No. 12/390,713, Non-Final Office Action mailed on Jan. 24, 2012, 9 pages.
U.S. Appl. No. 12/390,713, Notice of Allowance mailed on Mar. 20, 2013, 9 pages.

(Continued)

*Primary Examiner* — Jason K Gee
(74) *Attorney, Agent, or Firm* — Kilpatrick Townsend & Stockton LLP

(57) ABSTRACT

Techniques for credential auditing are provided. Histories for credentials are evaluated against a principal credential policy for a user and an enterprise credential policy for an enterprise as a whole. An audit trail is produced within a report for the histories. The report indicates whether compliance with the principal and enterprise credential policies occulted and if not at least one reason is provided as to why compliance was not met within the histories.

18 Claims, 3 Drawing Sheets

(56) References Cited

OTHER PUBLICATIONS

U.S. Appl. No. 12/390,713, Restriction Requirement mailed on Dec. 5, 2011, 6 pages.
U.S. Appl. No. 13/933,688, Non-Final Office Action mailed on May 16, 2014, 10 pages.
U.S. Appl. No. 13/933,806, Non-Final Office Action mailed on May 28, 2014, 10 pages.

* cited by examiner

TECHNIQUES FOR CREDENTIAL AUDITING

CROSS-REFERENCES TO RELATED APPLICATIONS

The present application is a Divisional of U.S. application Ser. No. 12/390,713, filed on Feb. 23, 2009, entitled "TECHNIQUES FOR CREDENTIAL AUDITING," of which the entire disclosure is incorporated herein by reference for all purposes.

The present application is also related to the following co-pending and commonly assigned U.S. patent applications:

U.S. patent application Ser. No. 13/933,806 filed concurrent herewith and entitled "TECHNIQUES FOR CREDENTIAL AUDITING," and which claims priority to U.S. application Ser. No. 12/390,713, filed on Feb. 23, 2009, entitled "TECHNIQUES FOR CREDENTIAL AUDITING;" and U.S. patent application Ser. No. 13/933,688 filed concurrent herewith and entitled "TECHNIQUES FOR CREDENTIAL AUDITING," and which claims priority to U.S. application Ser. No. 12/390,713, filed on Feb. 23, 2009, entitled "TECHNIQUES FOR CREDENTIAL AUDITING."

BACKGROUND

Password management systems store passwords for users when requested by the user, administrators, or other systems. The passwords managed by these systems can be used to validate users during login, synchronize passwords to other systems, and/or provide single sign-on services.

Security administrators configure password management systems with password policies to encourage their users to choose good passwords. The password policy may include password syntax rules, disallowed passwords rules, and password lifetime rules. Password syntax rules may include such rules as minimum and maximum password length, minimum and maximum number of characters from a character group, and/or the number of unique characters. Disallowed password rules specify strings that can not be the password or in some cases included in the password. These rules could disallow strings such as the user's current or previous passwords, words found in a dictionary, or user data such as telephone number, full name, or login name. Password lifetime rules may specify the minimum amount of time that must pass before the password can be changed and/or when a password expires and can no longer be used to authenticate the user.

Typically, when a password management system receives a request to store a password, it first verifies that the password meets the configured password policy. When the password is changed, the password management system adds the previous password to the user's password history. The password history also stores the time that each password was added to the password history. One of the purposes of the password history is to enforce the rule that disallows the reuse of previous passwords.

Because security administrators have the capability to change or turn off a password policy, it is difficult for security administrators to demonstrate to security auditors that the passwords chosen by users and administrators comply to the passwords policies. There are no password management systems that provide a mechanism for security administrators or security auditors to analyze and report that current and previous passwords comply with the password policy.

Thus, what is needed is a mechanism to analyze and report compliance of current and previous credentials to an enterprise credential policy.

SUMMARY

In various embodiments, techniques for credential auditing are provided. More specifically, and in an embodiment, a method is provided for auditing a principal's credentials. A request is received for auditing a credential of a principal within a secure environment. Next, a credential history is inspected for performing the audit. Finally, a report is generated for the credential; the report masks the credential and includes an indication as that indicates whether the credential and the credential history comply with a policy.

DETAILED DESCRIPTION

Figure 1:
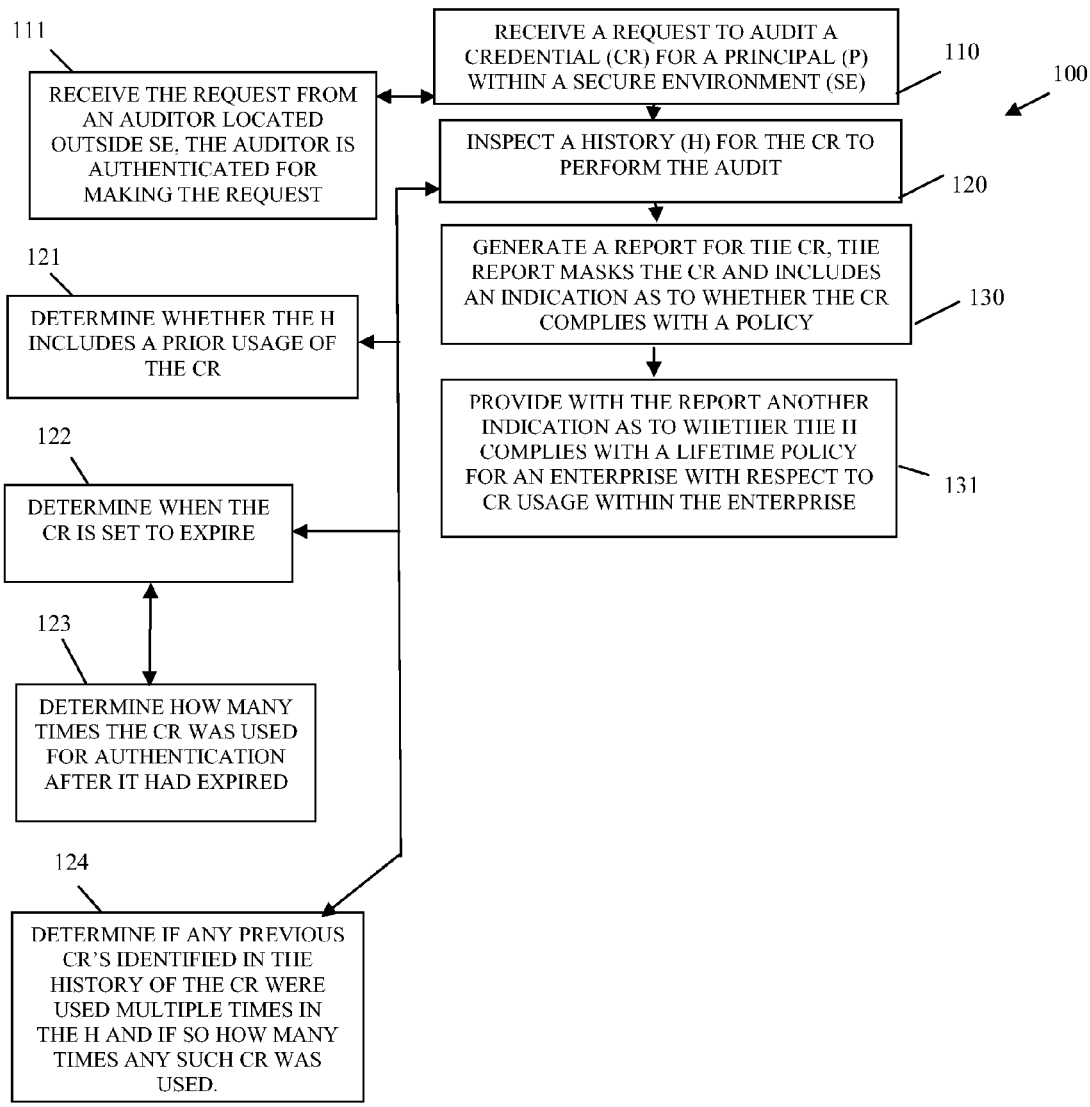
FIG. 1 is a diagram of a method for auditing a principal's credential, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "principal" is a special type of resource that includes a verifiable identity within an electronic context. Some example principals include a user and automated services that process on machines (processing devices). Principals can also include physical hardware devices such as proxies, clients, servers, peripherals, databases, bridges, routers, hubs, etc. So, the term principal includes a user but is broader than a user.

A "credential" is identity information used by a user or principal to authenticate itself within a secure environment. A "secure environment" is a processing environment that is monitored and requires an authenticated identity to access and also incorporates some form of secure communication, such as secure protocols (secure socket layer (SSL), etc.), encryption, etc. The credential can include such things as passwords, biometric information, digital signatures, digital certificates, keys, etc. Thus, a credential includes a password but can also include other types of identity information, such as some of the items listed above.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity services may authenticate and establish trust with one another, viewing one another as a specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

Again, it is noted that a resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, credentials, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for auditing a principal's credential, according to an example embodiment. The method 100 (hereinafter "credential auditing service") is implemented as instructions in a machine-accessible and computer-readable storage medium. The instructions when executed by a machine (computer, processor, etc.), which is configured to process the credential auditing service, perform the processing depicted in FIG. 1. The credential auditing service is also operational over and processes within a secure network and secure environment. The network may be accessible via connections that are wired, wireless, or a combination of wired and wireless.

The credential auditing service provides a processing perspective for producing credential audit reports from with a secure environment.

At 110, the credential auditing service receives a request to audit a credential for a principal within a secure environment. Here, the request can occur within the secure environment or from outside the secure environment. The request can occur via a manual request; it can be triggered by evaluation of a policy; and/or even based on the occurrence of an automatic detected event.

As an example, at 111, the credential auditing service receives the request from an auditor located outside the secure environment. The auditor is authenticated for making the request. That is, an identity service (such as the ones discussed and incorporated above) authenticates an identity of the auditor and ensures that the request can be properly made by the auditor before the request is processed within the secure environment. The request itself and the auditor can reside outside the perimeter of the secure environment.

At 120, the credential auditing service inspects a credential history for purposes of performing the audit. The history can be a log or version trail of previously used credentials for a particular principal. The actual credential used may not be disclosed to the credential auditing service. In fact, in some cases the credential and previous credentials may not be stored or maintained anywhere within the secure environment; rather, hash values for the credential and previous credentials are retained. In this manner, the actual text or string constant associated with any particular credential is never maintained and can never be compromised.

The history can include a variety of information that is useful in the auditing processing to the credential auditing service. For example, patterns for the credentials, frequency with which each pattern was used, creation dates and times for each credential, length of time that each credential was used and other information.

According to an embodiment, at 121, the credential auditing service determines whether the history includes prior usage of the credential. That is, the history is inspected to see if at some point in the life time of the principal (as known to the secure environment) the credential being audited was previously used. This can be done via a matching process on a string that represents the credential and the prior credentials identified in the history or it can be done via hash values for the credential and previous hash values for previous used credentials. So, again the actual text of the credentials may not be used. Moreover, the underlying secure credential management system may perforin the searching of a credential store to determine whether the credential was previously used in the history. In this way, the credential auditing service does not actually have access to credentials and may not actually discover the real values for previously used credentials because the underlying secure credential management system handles the actual comparisons on behalf of the credential auditing service.

In another case, at 122, the credential auditing service determines when the credential is set to expire. Here, credentials used within the secure environment have a limited life time that is controlled by some expiration policy of the enterprise and the history may identify when the expiration date and time for a particular credential is. It can also be the case that expiration policies are specific to a perceived strength of a particular credential. So, a credential that is determined to be strong can have a longer life time than another credential that is determined to be weaker in strength. The actual strength value (which can be computed based on policy) and the expiration dates can be included in the history that is being audited by the credential auditing service.

Continuing with the embodiment at 122 and at 123, the credential auditing service determines if the current credential has expired. As some systems allow expired credentials to be used a number of times or for a period of time after the credential has expired, the credential auditing service may report the number of times that the credential was used for authentication after it expired.

In yet another situation, at 124, the credential auditing service determines if any previous credentials identified in the credential history were used multiple times in the history and if so how many times any such credential was used. Here, the history captures the credentials and tracking and versioning information associated therewith that the principal has used to authenticate within the secure environment over the life time of the principal (as known to the secure environment). If a particular credential was used multiple times then this fact can be captured and recorded during the audit via inspection of the history.

At 130, the credential auditing service generates a report regarding the credential and the credential history. The report masks the credential and/or the credential history and includes an indication as to whether the credential and credential history complies with a policy. The credential and credential history are inspected in the manners discussed above in the various discussed embodiments by the credential auditing service. Moreover, the credential and credential history are evaluated in view of the policy that defines enterprise or credential specific limitations or expectations as defined by an administrator of the enterprise's credential management system. Some example limitations may include specific syntax requirements, such as using alphanumeric and numeric characters, using punctuation characters, requiring a specific minimum and/or maximum length for a credential, restricting usage of certain substrings within a credential, and the like.

According to an embodiment, at 131, the credential auditing service provides with the report another indication as to whether the history complies with a lifetime policy for the enterprise with respect to the credential usage within the enterprise. Here, the original policy evaluated at 130 is specific to a principal associated with the credential being audited or specific to a role that the principal is assigned to within an enterprise whereas the lifetime policy are global restrictions within the enterprise that span multiple different principals, roles, and groups. So, the policy can be local (original policy at 130) and/or global (lifetime policy at 131).

Figure 2:
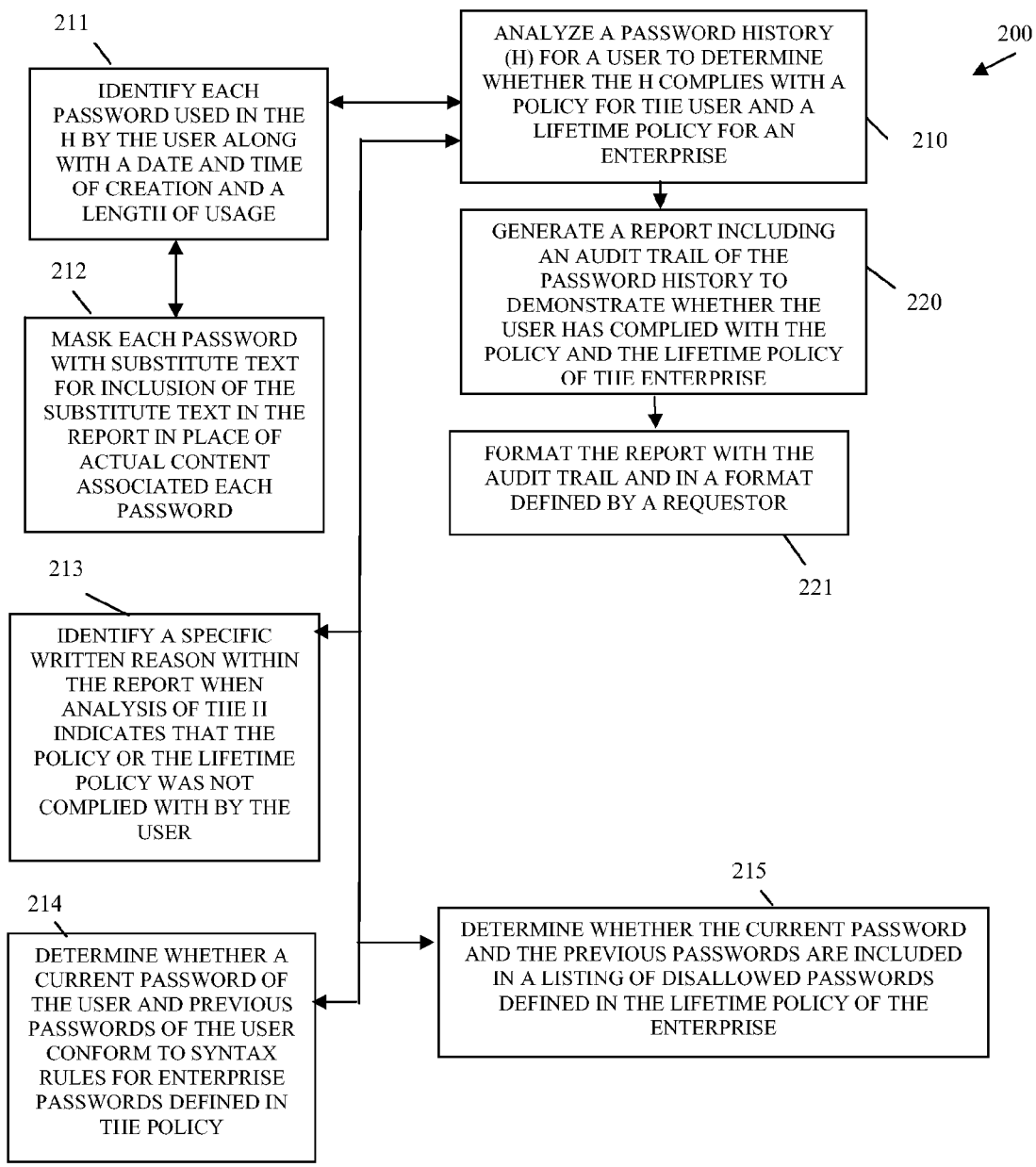
FIG. 2 is a diagram of a method for auditing usage of passwords within an enterprise, according to an example embodiment.

FIG. 2 is a diagram of a method 200 for auditing usage of passwords within an enterprise, according to an example embodiment. The method 200 (hereinafter "password auditing service") is implemented as instructions in a machine-accessible and computer-readable storage medium. The instructions when executed by a machine (computer, processor, etc.), which is configured to process the password auditing service, perform the processing depicted in FIG. 2. The password auditing service is also operational over and processes within a network or secure environment. The network may be accessed via connections that are wired, wireless, or a combination of wired and wireless.

The password auditing service presents another and specific processing perspective of the credential auditing service, which was discussed above with reference to the method 100 of the FIG. 1.

At 210, the password auditing service analyzes a password history for a particular user to determine whether the information included in the history complies with a policy for the user and a lifetime policy for an enterprise. Here, a user's prior passwords to access a secure environment of an enterprise are captured and recorded along with a variety of other tracking, versioning, and metadata (as discussed above with reference to the method 100); the prior passwords and related information are captured in the history.

According to an embodiment, at 211, the password auditing service identifies each password used in the history by the user along with a date and time of creation and a length of usage. So, each prior password includes metadata that identifies when that password was created and for how long it was used. This type of metadata can be useful in evaluating whether compliance to the policy and the lifetime policy has been achieved with the user within the secure environment.

Continuing with the embodiment at 211 and at 212, the password auditing service masks each password with substitute text. The substitute text is included in the report in place of the actual content associated with each password. The actual password strings are never published or disclosed rather the substitute text is used as a redaction to maintain secrecy.

In still another situation, at 213, the password auditing service identifies a specific written reason within the report when analysis of the history indicates that the policy or the lifetime policy was not complied with by the user. For instance, the report may state "user on date Y used a repeated or a variation of a prior used password which is forbidden by policy X." Specific strings can be developed and included in a library that the password auditing service uses to substitute in specific information obtained from the history data of the user to give an automated and specific reason why compliance was not achieved. So, in the prior example the variables such as "user, date, and policy" are automatically substituted into a string acquired from a library to provide in the report specific details or reasons as to why compliance was not achieved.

In an embodiment, at 214, the password auditing service determines whether a current password of the user and previous passwords of the user conform to syntax rules for enterprise passwords defined in the policy. Here, such things as password strings without numeric characters, without punctuation characters, without a mixture of upper and lower case characters, etc. can be identified and included in the report.

In another case, at 215, the password auditing service determines whether the current password and the previous passwords are included in a listing of disallowed passwords defined in the policy of the enterprise. So, some strings or substrings may be prohibited by the enterprise, such as proper names, common dictionary words, names of sports teams, personal information, etc.

At 220, the password auditing service generates a report that includes an audit trail for the password history to demonstrate whether the user has complied with the policy and the lifetime policy of the enterprise. The report can be used for compliance auditing to demonstrate that an enterprise is not hiding information and has complied with regulations. These reports may be used in some industries to demonstrate government compliance.

According to an embodiment, at 221, the password auditing service formats the report with the audit trail and in a format defined by a requestor. So, any desired format can be generated and rendered by the password auditing service. In some cases, the reports may be generated in response to templates that identify specific fields and types of information that are needed and the password auditing service acquires the specific data from the password history to populate the fields and types of information to satisfy the request for the reports.

Figure 3:
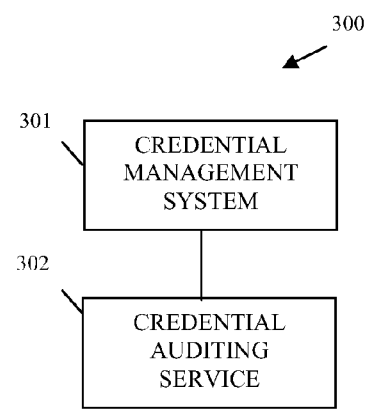
FIG. 3 is a diagram of a credential auditing system, according to an example embodiment.

FIG. 3 is a diagram a credential auditing system 300, according to an example embodiment. The credential auditing system 300 is implemented as instructions (within a machine-accessible and computer-readable storage medium) that when executed by a machine (processor, etc.) perform, among other things, the processing discussed above with respect to the method 100 of the FIG. 1. Moreover, the credential auditing system 300 is operational over a secure network or secure environment, and the network is accessible over connections that may be wired, wireless, or a combination of wired and wireless.

The credential auditing system 300 includes a credential management system 301 and a credential auditing service 302. Each of these components of the credential auditing system 300 and their interactions with one another will now be discussed in detail.

The credential auditing system 301 is implemented in a computer-readable storage medium and processes on one or more processors of a secure network. Example processing of the credential auditing system 301 was presented above in detail with reference to the method 100 of the FIG. 1.

The credential auditing system 301 permits the credential auditing service 302 to access a credential store having credentials of a principal for an enterprise along with histories for the credentials of the principals. It is noted that the credential store may not actually store the true values or content for the credentials; rather, hash values that the true values or content computer to are stored and accessible to the credential auditing service 302.

The credential auditing service 302 is implemented in a computer-readable storage medium as instructions that process on the one or more processors of the secure network. Example processing associated with the credential auditing service 302 was presented above in detail with reference to the method 100 of the FIG. 1.

The credential auditing service 302 audits the histories in response to authorized requests that are initiated outside the secure environment and the credential auditing service 302 generates reports for the audits to demonstrate whether the histories comply with a credential policy.

According to an embodiment, the credential auditing service 302 compares past credentials and a current credential of a particular principal against permissible credential syntax rules in the credential policy when processing a particular audit.

In another case, the credential auditing service 302 compares the past credentials and the current credential against disallowed credentials that are identified via the credential policy. Here, strings or substrings or even patterns for strings or substrings are recorded and checked by the credential auditing service 302 to ensure they have not been used in the history and if they have been indications are noted in the reports.

In an embodiment, the credential policy includes a reference to a table or data store that includes the disallowed credentials. So, the policy provides a reference to access the table or data store to compare the histories with the known disallowed credentials.

In still another situation, the credential auditing service provides an indication of previously used credentials along with a format, date of usage, and length of usage within the reports.

Continuing with the previous embodiment, the format of the previously used credentials is masked so as to hide the actual strings associated with the previously used credentials.

Figure 4:
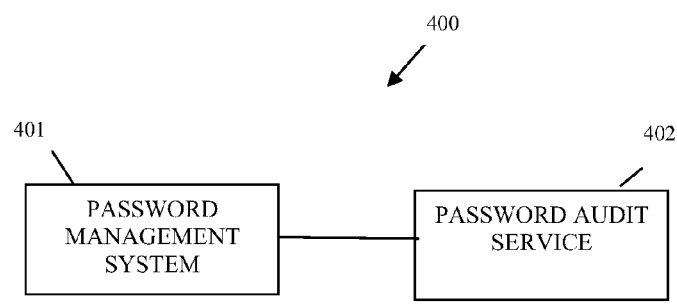
FIG. 4 is a diagram of a password compliance reporting system, according to an example embodiment.

FIG. 4 is a diagram of password compliance reporting system 400, according to an example embodiment. The password compliance reporting system 400 is implemented as instructions on or within a machine-accessible and computer-readable storage medium. The instructions when executed by one or more machines (processor, computer, etc.) perform processing depicted with respect to the method 200 of the FIG. 2. The password compliance reporting system 400 is also operational over a secure network or secure environment and the network may be accessed over connections that are wired, wireless, or a combination of wired and wireless.

The password compliance reporting system 400 presents a specific instance and in some cases enhanced perspective of the credential auditing system 300 discussed above with reference to the FIG. 3.

The password compliance reporting system 400 includes a password management system 401 and a password audit service 402. Each of these and their interactions with one another will now be discussed in detail.

The password management system 401 is implemented in a computer-readable storage medium and is executed by one or more processors of the secure network. Example processing associated with the password management system 401 was presented in detail above with reference to the method 200 of the FIG. 2.

The password compliance management system 401 maintains passwords for users of an enterprise within a secure environment and does not permit the passwords to be exposed outside the secure environment.

The password audit service 402 is implemented as a component of the password management system 401 within a computer-readable storage medium and executes on the one or more processors of the secure network. Example processing associated with the password audit service 402 was presented in detail above with reference to the method 200 of the FIG. 2.

The password audit service 402 interacts with the password management system 401 to audit passwords for compliance with a policy. The password audit service 402 generates reports to demonstrate whether particular users have complied or have not complied with the policy and when non compliance is detected; the password audit service 402 provides a reason for the non compliance via the reports.

According to an embodiment, the password audit service 402 identifies frequently used patterns for the passwords within a particular report, which is generated for the enterprise as a whole.

In another case, the password audit service 402 includes patterns for the passwords within the reports without disclosing actual strings associated with the passwords.

The patterns can identify what the password strings appear as within the histories without identifying the actual contents, such as "AaNN" where "A" indicates the presence of any uppercase alphabetic character, "a" indicates the presence of any lowercase alphabetic character, and "NN" indicates a two digit number. It is understood that a variety of patterns can be detected and reported from the histories and that this can be done without disclosing the actual content of the password strings. Moreover, some patterns may be prohibited by the policy and detected during the audit and if so such situations can be identified in the reports.

In an embodiment, the password audit service 402 provides different types of reports depending upon a particular request. The types can vary; for example some types can include: specific user password reports, specific password reports (for specific passwords or specific patterns of passwords), group password reports, and/or enterprise as a whole password reports.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising:
   one or more processors; and
   a memory coupled with and readable by the processors and storing therein a set of instructions which, when executed by the processors, causes the processor to:
      maintain a credential store having credentials of principals for an enterprise along with histories for the credentials of the principals, each credential history comprising a log of previously used credentials for a principal identified by a hash value for each credential instead of the credential, and
      provide a credential auditing service, wherein the credential auditing service receives a request to audit a credential for a principal, inspects a credential history for the principal without accessing the credential, performs the audit of the credential of the principal based on said inspecting, wherein performing the audit includes making determinations regarding expiration and prior use of the credential, and generates a report for the credential based on said inspecting and performing the audit, wherein the report masks the credential and the credential history and includes an indication as to whether the credential complies with a policy for credential usage.

2. The system of claim 1, wherein the credential auditing service compares past credentials and a current credential of a particular principal against permissible credential syntax rules defined in the credential policy when processing a particular audit.

3. The system of claim 2, wherein the credential auditing service compares the past credentials and the current credential against disallowed credentials that are identified via the credential policy.

4. The system of claim 3, wherein the credential policy includes a reference to a table or data store that includes the disallowed credentials.

5. The system of claim 1, wherein credential auditing service provides an indication of previously used credentials along with a format, date of usage, and length of usage within the reports.

6. The system of claim 1, wherein the format is masked so as to hide actual strings associated with the previously used credentials.

7. A method comprising:
   maintaining, by a credential management system, a credential store having credentials of principals for an enterprise along with histories for the credentials of the principals, each credential history comprising a log of previously used credentials for a principal identified by a hash value for each credential instead of the credential;
   receiving, by a credential auditing service, a request to audit a credential for a principal;
   inspecting, by the credential auditing service, a credential history for the principal without accessing the credential;
   performing, by the credential auditing service, the audit of the credential of the principal based on said inspecting, wherein performing the audit includes making determinations regarding expiration and prior use of the credential; and
   generating, by the credential auditing service, a report for the credential based on said inspecting and performing the audit, wherein the report masks the credential and the credential history and includes an indication as to whether the credential complies with a policy for credential usage.

8. The method of claim 7, further comprising comparing, by the credential auditing service, past credentials and a current credential of a particular principal against permissible credential syntax rules defined in the credential policy when processing a particular audit.

9. The method of claim 8, further comprising comparing, by the credential auditing service, the past credentials and the current credential against disallowed credentials that are identified via the credential policy.

10. The method of claim 9, wherein the credential policy includes a reference to a table or data store that includes the disallowed credentials.

11. The method of claim 7, further comprising providing, by the credential auditing service, an indication of previously used credentials along with a format, date of usage, and length of usage within the reports.

12. The method of claim 7, wherein the format is masked so as to hide actual strings associated with the previously used credentials.

13. A non-transitory computer-readable memory comprising a set of instructions stored therein which, when executed by a processor, causes the processor to audit credentials by:
   maintaining, by a credential management system, a credential store having credentials of principals for an enterprise along with histories for the credentials of the principals, each credential history comprising a log of previously used credentials for a principal identified by a hash value for each credential instead of the credential;
   receiving, by a credential auditing service, a request to audit a credential for a principal;
   inspecting, by the credential auditing service, a credential history for the principal without accessing the credential;

performing, by the credential auditing service, the audit of the credential of the principal based on said inspecting, wherein performing the audit includes making determinations regarding expiration and prior use of the credential; and generating, by the credential auditing service, a report for the credential based on said inspecting and performing the audit, wherein the report masks the credential and the credential history and includes an indication as to whether the credential complies with a policy for credential usage.

14. The non-transitory computer-readable memory of claim 13, further comprising comparing, by the credential auditing service, past credentials and a current credential of a particular principal against permissible credential syntax rules defined in the credential policy when processing a particular audit.

15. The non-transitory computer-readable memory of claim 13, further comprising comparing, by the credential auditing service, the past credentials and the current credential against disallowed credentials that are identified via the credential policy.

16. The non-transitory computer-readable memory of claim 15, wherein the credential policy includes a reference to a table or data store that includes the disallowed credentials.

17. The non-transitory computer-readable memory of claim 13, further comprising providing, by the credential auditing service, an indication of previously used credentials along with a format, date of usage, and length of usage within the reports.

18. The non-transitory computer-readable memory of claim 13, wherein the format is masked so as to hide actual strings associated with the previously used credentials.

* * * * *

UNITED STATES PATENT AND TRADEMARK OFFICE
CERTIFICATE OF CORRECTION

| | |
|---|---|
| PATENT NO. | : 8,949,932 B2 |
| APPLICATION NO. | : 13/933754 |
| DATED | : February 3, 2015 |
| INVENTOR(S) | : Henderson et al. |

Page 1 of 1

It is certified that error appears in the above-identified patent and that said Letters Patent is hereby corrected as shown below:

Title page, column 2, under abstract, line 6, delete "occulted" and insert -- occurred --, therefor.

In the drawings,

On sheet 1 of 3, in figure 1, under reference numeral 130, line 1, delete "TIIE CR, TIIE" and insert -- THE CR, THE --, therefor.

On sheet 1 of 3, in figure 1, under reference numeral 131, line 2, delete "TIIE II" and insert -- THE H -- therefor.

On sheet 2 of 3, in figure 2, under reference numeral 211, line 6, delete "LENGTII" and insert -- LENGTH --, therefor.

On sheet 2 of 3, in figure 2, under reference numeral 220, line 7, delete "TIIE" and insert -- THE --, therefor.

On sheet 2 of 3, in figure 2, under reference numeral 213, line 4, delete "TIIE II" and insert -- THE H --, therefor.

In the specification,

In column 4, line 63, delete "perforin" and insert -- perform --, therefor.

Signed and Sealed this
Twenty-fourth Day of November, 2015

Michelle K. Lee
*Director of the United States Patent and Trademark Office*